O. L. WHITEMAN.
CHECK VALVE.
APPLICATION FILED MAY 16, 1911.
1,052,633.
Patented Feb. 11, 1913.
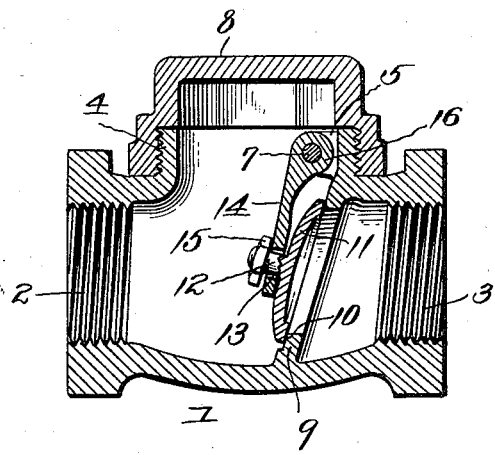
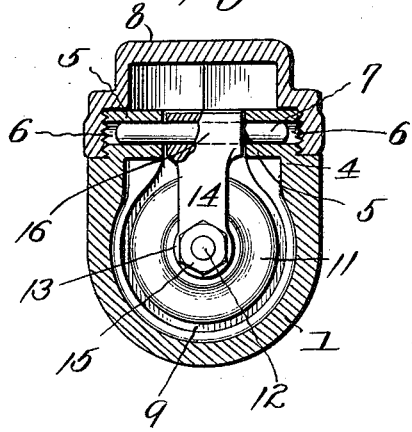
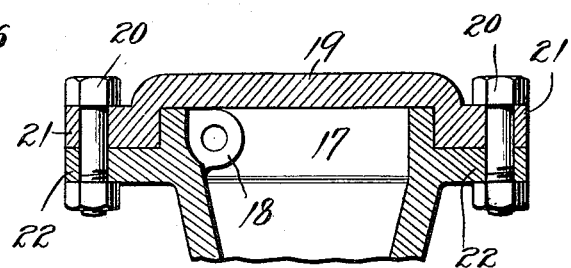
WITNESSES
INVENTOR
O. L. Whiteman
By E. B. Stocking, Attorney

UNITED STATES PATENT OFFICE.

OWEN L. WHITEMAN, OF COXSACKIE, NEW YORK.

CHECK-VALVE.

1,052,633.  Specification of Letters Patent.  Patented Feb. 11, 1913.

Application filed May 16, 1911. Serial No. 627,618.

*To all whom it may concern:*

Be it known that I, OWEN L. WHITEMAN, a citizen of the United States, residing at Coxsackie, county of Greene, State of New York, have invented certain new and useful Improvements in Check-Valves, of which the following is a specification, reference being had therein to the accompanying drawing.

This invention relates to certain new and useful improvements in check valves, the main object of the invention being to provide a valve in which the valve proper is so mounted that the same may be easily and quickly attached or detached.

Another object of the invention is to provide a valve which is exceedingly neat in appearance and one in which the neck and cap for closing the opening to remove and insert the valve is greatly reduced in size, thereby facilitating the placing of the valve in position in close quarters without removing the cap.

A further object of the invention is to provide a valve which will overcome the disadvantages now existing in having side plugs for supporting the pivot pin of the valve whereby leakage is prevented.

A still further object of the invention is to provide a valve in which the pin is so mounted and retained by the cap that all danger of the pin binding is prevented and at the same time a large bearing portion is formed for the valve supporting arm.

Other and further objects and advantages of the invention will be hereinafter set forth and the novel features thereof defined by the appended claims.

In the drawing—Figure 1 is a longitudinal vertical section through my improved valve; Fig. 2 is a transverse vertical section, the bearing portion of the arm being partly broken away; Fig. 3 is a detail section through a slightly modified form showing a portion of an iron body check valve where the cap is bolted in position instead of being screwed.

Like numerals of reference refer to like parts in the several figures of the drawing.

In the drawing, 1 indicates a valve casing having the usual oppositely disposed threaded inlet and outlet ports 2 and 3 to which the respective pipes are connected in the ordinary manner. The casing 1 is provided with a central upwardly projecting threaded neck portion 4 having internal oppositely disposed shoulders or lugs 5 in which are formed transverse bores 6 extending out through the threaded walls of the neck as clearly shown in Fig. 2 forming bearings for the detachable pivot pin 7 which may be readily inserted or detached from either end. The neck is closed by an internally threaded cap 8 and as shown in Fig. 2, this cap locks the pin within its bearings in such a manner that it will be impossible for the same to be moved out of position as long as the cap is in place. It will be seen, however, that when the cap is removed by inserting a suitable instrument in either of the bearings, the pin may be forced outwardly. By this construction, an exceedingly water-tight joint is formed over the bearings of the pin so that it is impossible for any leakage to occur.

A diaphragm 9 is formed in the valve casing having a valve seat 10 adapted to receive the valve 11 which is provided with an integral bolt 12 loosely mounted in the apertured end 13 of an arm 14 and secured in position by a nut 15 in such a manner that the valve will have an independent movement in order to allow the same to form a perfect seat. The arm is provided with a sleeve portion 16 of a length slightly less than the distance between the lugs 5 and is adapted to be pivotally mounted on a pivot pin 7 in such a manner that the same can swing freely. It will be seen that I have provided an exceedingly large bearing for the arm and for the pin whereby the wear on the same is decreased to the minimum. It will also be seen that by this construction and manner of mounting the valve, the seat can be readily ground and the valve can be easily and quickly inserted or removed through the neck.

In the modification shown in Fig. 3, I show an iron body check valve casing in which the neck 17 is provided with similarly formed lugs 18 having bores extending therethrough to receive the pintle pin of the valve, the same being held in position therein by a cap 19 which is secured in position by bolts 20 passing through the flange 21 of the cap and the flange 22 of the neck.

Having described my invention and set forth its merits, what I claim and desire to secure by Letters Patent is—

1. A check valve comprising a casing having oppositely disposed interiorly threaded inlet and outlet ports, and an obliquely arranged seat between said ports, an intermediate externally threaded neck formed integral with said casing at right angles to said ports, said neck being provided with oppositely disposed interior inwardly projecting lugs having transverse bores extending outwardly through the walls of the neck, an arm having a sleeve portion at one end arranged between said lugs, a pin of a length slightly less than the width of the neck mounted in the bores of said lugs and extending through the sleeve of said arm and upon which said arm is pivotally mounted, a valve carried by the free end of said arm, co-acting with said seat, and an interiorly threaded cap mounted upon said neck inclosing the ends of said bores and securing said pin therein.

2. A check valve comprising a casing having oppositely disposed inlet and outlet ports, an obliquely arranged seat formed in said casing adjacent the inlet port comprising an annularly arranged oblique flange, an intermediate externally threaded neck formed integral with said casing at right angles to said ports, one inner wall of said neck being provided with oppositely disposed inwardly projecting lugs having transverse bores extending outwardly through the walls of the neck, a pin of a length slightly less than the width of the neck loosely mounted in the bores of said lugs, a valve-carrying arm having a sleeve at one end loosely mounted upon said pin between said lugs, a valve carried by said arm co-acting with said seat, and an externally threaded cap mounted upon said neck inclosing the ends of said bores for securing said pin therein.

In testimony whereof I affix my signature in presence of two witnesses.

OWEN L. WHITEMAN.

Witnesses:
CHAS. P. STONE,
W. T. RIDER.

Copies of this patent may be obtained for five cents each, by addressing the "Commissioner of Patents, Washington, D. C."